United States Patent
Deng

[19]

[11] Patent Number: 6,076,798
[45] Date of Patent: Jun. 20, 2000

[54] FLUID ACTUATING VALVE

[76] Inventor: Jingxing Deng, Academia of Sinica, No. 27, Taoyuannanhi, Taiyuan City, Shinai Province 03001, P.R., China

[21] Appl. No.: 09/051,441
[22] PCT Filed: Sep. 28, 1996
[86] PCT No.: PCT/CN96/00082
  § 371 Date: Aug. 24, 1998
  § 102(e) Date: Aug. 24, 1998
[87] PCT Pub. No.: WO97/13993
  PCT Pub. Date: Apr. 17, 1997

[30] Foreign Application Priority Data

Oct. 9, 1995 [CN] China ................ 95117747
  Oct. 9, 1995 [CN] China ................ 95223795

[51] Int. Cl.⁷ .................................. F16K 31/124
[52] U.S. Cl. .................. 251/36; 137/494; 251/44; 251/45; 251/50
[58] Field of Search .................. 251/36, 33, 50, 251/43, 44, 45; 137/494

[56] References Cited

U.S. PATENT DOCUMENTS

| | | | |
|---|---|---|---|
| 570,727 | 11/1896 | Gale . | |
| 1,176,535 | 4/1916 | Fulton | 251/45 |
| 1,486,291 | 3/1924 | McAneny | 251/33 |
| 1,579,940 | 4/1926 | Iversen | 137/494 |
| 2,417,994 | 3/1947 | Sheets | 251/45 X |
| 2,825,526 | 3/1958 | Zuiderhoek | 251/44 |
| 2,991,796 | 7/1961 | Griswold | 251/50 X |
| 3,282,556 | 11/1966 | Hancock | 251/45 X |
| 4,058,287 | 11/1977 | Fromfield | 251/46 |

*Primary Examiner*—Stephen M. Hepperle
*Assistant Examiner*—John Bastianelli
*Attorney, Agent, or Firm*—Rothwell, Figg, Ernst & Kurz

[57] ABSTRACT

The present invention relates to a fluid actuating valve, wherein the valve body (1) comprises a longitudinal tubular body (11) and a transversal cylinder body (12), the longitudinal tubular body (11) defines a longitudinal fluid passage (113), and the transversal cylinder body (12) defines a valve chamber (121), a transversal well (114) is disposed in the middle of the longitudinal tubular body (11), and the upper surface (116) of the transversal well (114) is served as a valve seat. A valve core assembly (3) is provided in the transversal well (114), which engages with the inner wall of the well and the valve seat and is lifted by the pressure fluid coming from the valve inlet to open the valve. A pressure-releasing hole (1111) is provided at the outlet side of the longitudinal tubular body (11) to connect the valve chamber (121) with the longitudinal fluid passage (113) to the outlet side. An actuating element (5) is installed in the valve chamber (121) under the valve cap (2), which can drop the valve core assembly (3) to shut the valve by the pressure fluid coming from the fluid-controlling pipe assembly (4). The fluid actuating valve of the present invention has the following advantages: small resistance force, lower pressure loss, longer durability and liability, and in particular, useful for producing a heavy-caliber fluid actuating valve which can work at high pressure.

19 Claims, 12 Drawing Sheets

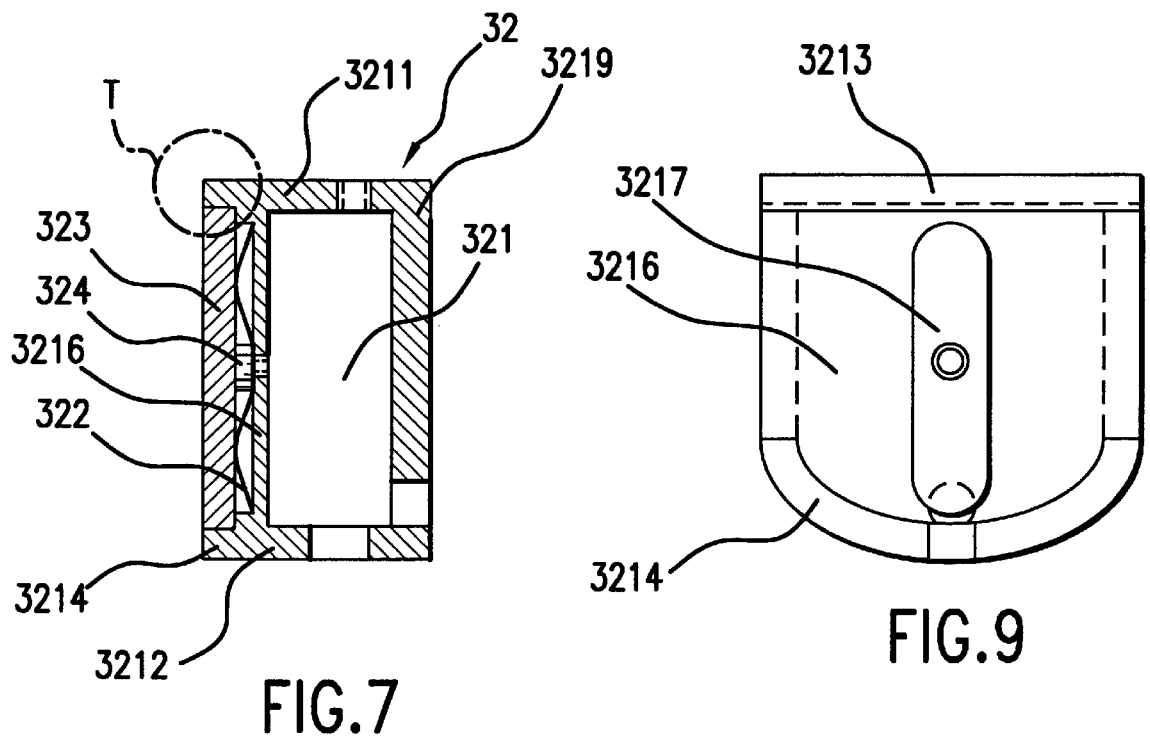
FIG.7
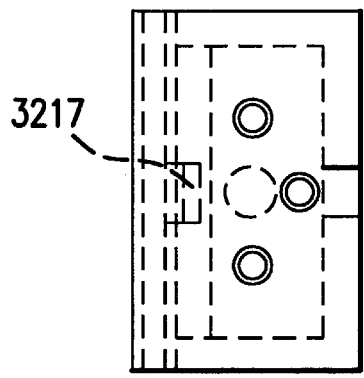
FIG.8
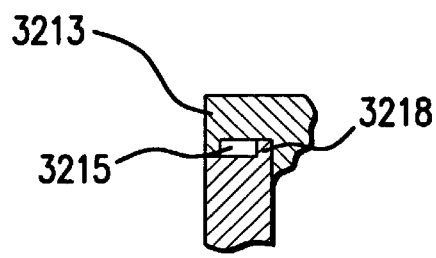
FIG.9
FIG.10

FLUID ACTUATING VALVE

FIELD OF THE INVENTION

The present invention relates to a fluid actuating valve.

BACKGROUND OF THE INVENTION

Chinese Utility Model Patent No. CN2038980u discloses a diaphragm shutoff valve. The valve comprises a valve body with a valve seat, a valve cap fixed hermetically to the valve body, a diaphragm and a valve core located in the valve chamber defined by the valve body and the valve cap. The diaphragm edge is between the valve body and the valve cap and the diaphragm is disposed to the valve core. There is a vertical chamber in the valve body and the valve cap, which has three openings that are connected to the outlet and inlet passage of the valve body and the fluid chamber defined by the diaphragm and the valve cap. A valve rod together with a set of valve clacks are provided in the vertical chamber, which constitutes a small manual control valve. When the valve rod is rotated clockwise, the clacks will block the outlet of the valve body and open the inlet of the valve body at the same time, by which the pressure fluid coming from the inlet passage of the valve body enters into the liquid chamber through vertical chamber, pushes the diaphragm and valve core downwards and then against the valve seat, and as a result, the shutoff valve is shut. When the rod is rotated anti-clockwise, the clacks will block the opening connected to the inlet of the valve body and open the opening connected to the outlet of the valve body at the same time, by which the pressure fluid flows out of the liquid chamber through vertical chamber into the inlet fluid passage of valve body, pushes the valve core and diaphragm away from valve seat, and as a result, the shutoff valve is opened.

The above-mentioned shutoff valve is controlled by a small control valve working under the force of the pressure fluid, which make it convenient to open or shut the valve. But the shutoff valve also has some defects resulting from its structure.

OBJECT OF THE INVENTION

The object of the present invention is to provide a fluid actuating valve with small resistance force, low pressure loss, long durability and reliability, and in particular, a heavy-caliber fluid actuating valve which can work at high pressure.

The fluid actuating valve of the present invention has a structure as follows:

SUMMARY OF THE INVENTION

The present invention relates to a fluid actuating valve composed of a valve body, a valve cap, a valve core assembly, a fluid-controlling pipe assembly and an actuating element, characterized in that: the valve body comprises a longitudinal tubular body and a transversal cylinder body, the longitudinal tubular body defines a fluid passage from the inlet to the outlet of the valve body, and the transversal cylinder body defines a valve chamber, a transversal well is disposed in the middle of the longitudinal tubular body for connecting the longitudinal fluid passage with the valve chamber, and a valve seat is formed on the upper surface of the transversal well, a valve core assembly is disposed on the transversal well, which engages with the inner wall of the well and the valve seat and is lifted by the pressure fluid coming from the valve inlet to open the valve, a pressure-releasing hole is provided at the outlet side of the longitudinal tubular body to connect the valve chamber with the longitudinal fluid passage to the outlet side, an actuating element is installed in the valve chamber under the valve cap, which can drop the valve core assembly to shut the valve by the pressure fluid coming from the fluid-controlling pipe assembly.

A fluid actuating valve composed of a valve body, a valve cap, a valve core assembly, a fluid-controlling pipe assembly and an actuating element, characterized in that: the valve body comprises a longitudinal tubular body and a transversal cylinder body, the longitudinal tubular body defines a longitudinal fluid passage, and the transversal cylinder body defines a valve chamber, a transversal well is disposed in the middle of the longitudinal tubular body to connect the vertical fluid passage with the valve chamber, the cylinder of the transversal well is square-shaped and the bottom of the transversal well is arc-shaped, a valve seat is formed on the upper surface of the transversal well, a valve core assembly is disposed on the transversal well, the core assembly comprises a horizontal valve plate and a vertical square box assembly which is fixed to the horizontal valve plate and can enter into the transversal well, the lower surface of the horizontal valve plate can hermetically contact the valve seat, the vertical square box assembly includes a vertical square box and two vertical slots are formed in the middle of the front and back vertical walls of the box respectively, two pin-holes are formed on both sides of the slot, and two pins are fixed to a plate with arc-shaped bottom, the two plates with fixed pins are installed on the front and back walls of the box through the two pinholes, the plates can slip to both sides due to the curve-shaped springs and contact the corresponding well wall hermetically, two aligned holes are formed on the front and back vertical walls of the box and at the lower part of the two plates fixed to the walls respectively, a shaft with a small valve plate is installed between the two vertical walls, and the small valve plate can move along the shaft to block the through holes on the vertical walls by the various-directional pressure fluids, a pressure-releasing hole is formed on the longitudinal tubular body at both sides of the transversal well respectively, which connects the valve chamber with the vertical fluid passage, a one-way valve is installed at the pressure-releasing hole, which only allows the fluid to flow from the valve chamber to the longitudinal fluid passage, an actuating element is installed in the valve chamber below the valve cap, which can drop the valve core assembly to shut the valve under the force of the fluid coming from the fluid-controlling pipe assembly.

The fluid actuating valve of the present invention has the following advantages as compared with the above-mentioned diaphragm shutoff valves:

The above-mentioned diaphragm shutoff valve has separating walls which are indispensable for forming a valve seat in the fluid passage. The fluid entering into the valve inlet must go through the valve seat holes before flowing out from the valve body via the outgoing fluid passage. As a result, there exists larger pressure loss due to larger resistance. The fluid passage of the fluid actuating valve of the present invention is straight with no separate wall. The fluid does not flow through the valve seat holes. Therefore, the resistance and the pressure loss are smaller.

In the above-mentioned diaphragm shutoff valve, diaphragm is applied as an actuating element, which will lead to following problems: the root of the diaphragm is liable to fatigue damage resulting from frequent bending during frequent opening and shutting operations. The stroke of the diaphragm can not be large. Therefore, the diaphragm can not be used for heavy-caliber valves. The diaphragm is not made from pressure-resistant material and can not be used for high-pressure valves. The fluid actuating valve of the invention, which does not adapt diaphragm as the actuating element, are free from above-mentioned defects and has long durability, and can also be applied in heavy-caliber valves working under high-pressure.

BRIEF INTRODUCTION ON THE DRAWINGS

Figure 4:
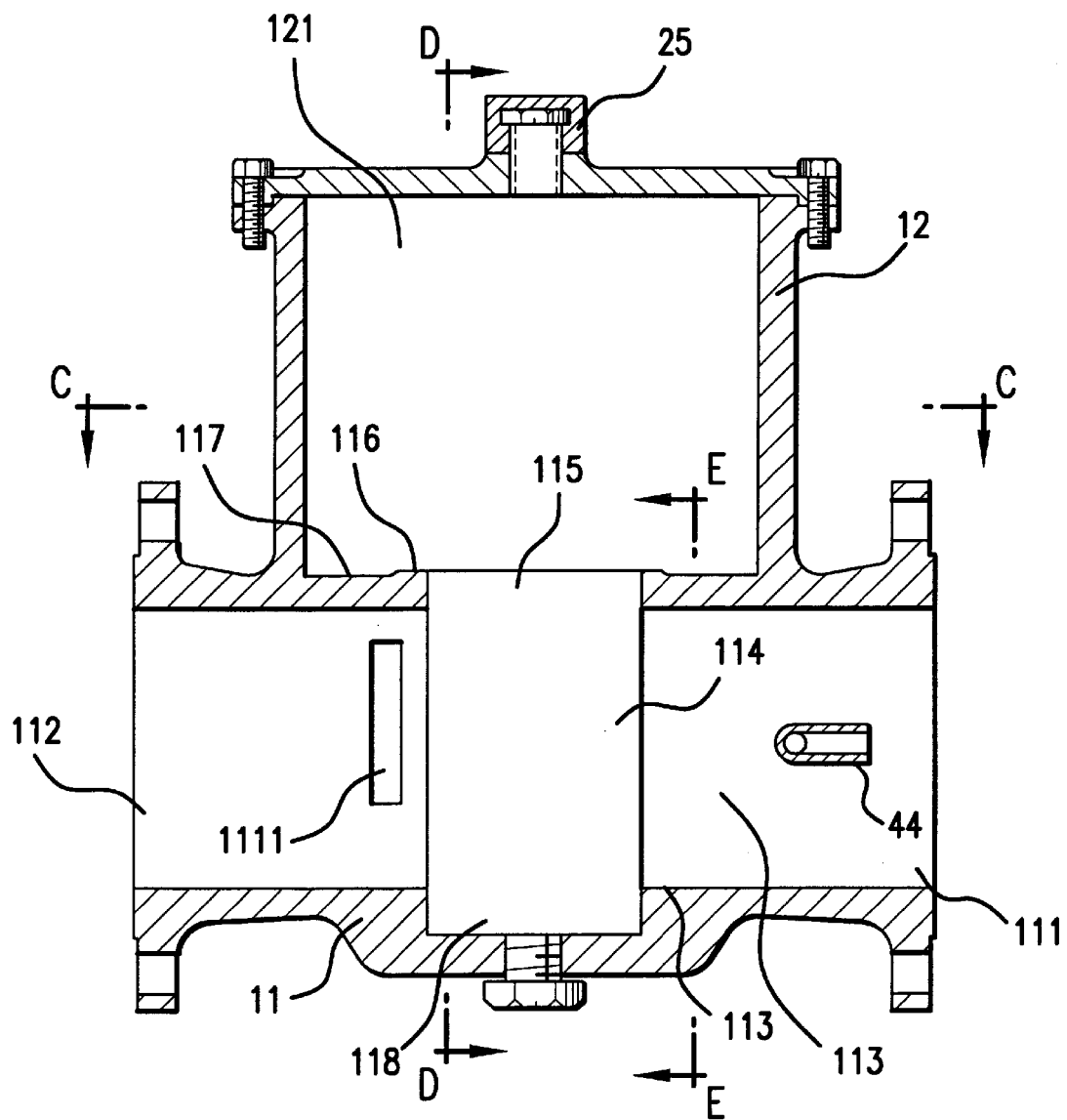
FIG. 4 is a longitudinal cross section view of the valve body of FIG. 1.
Figure 6:
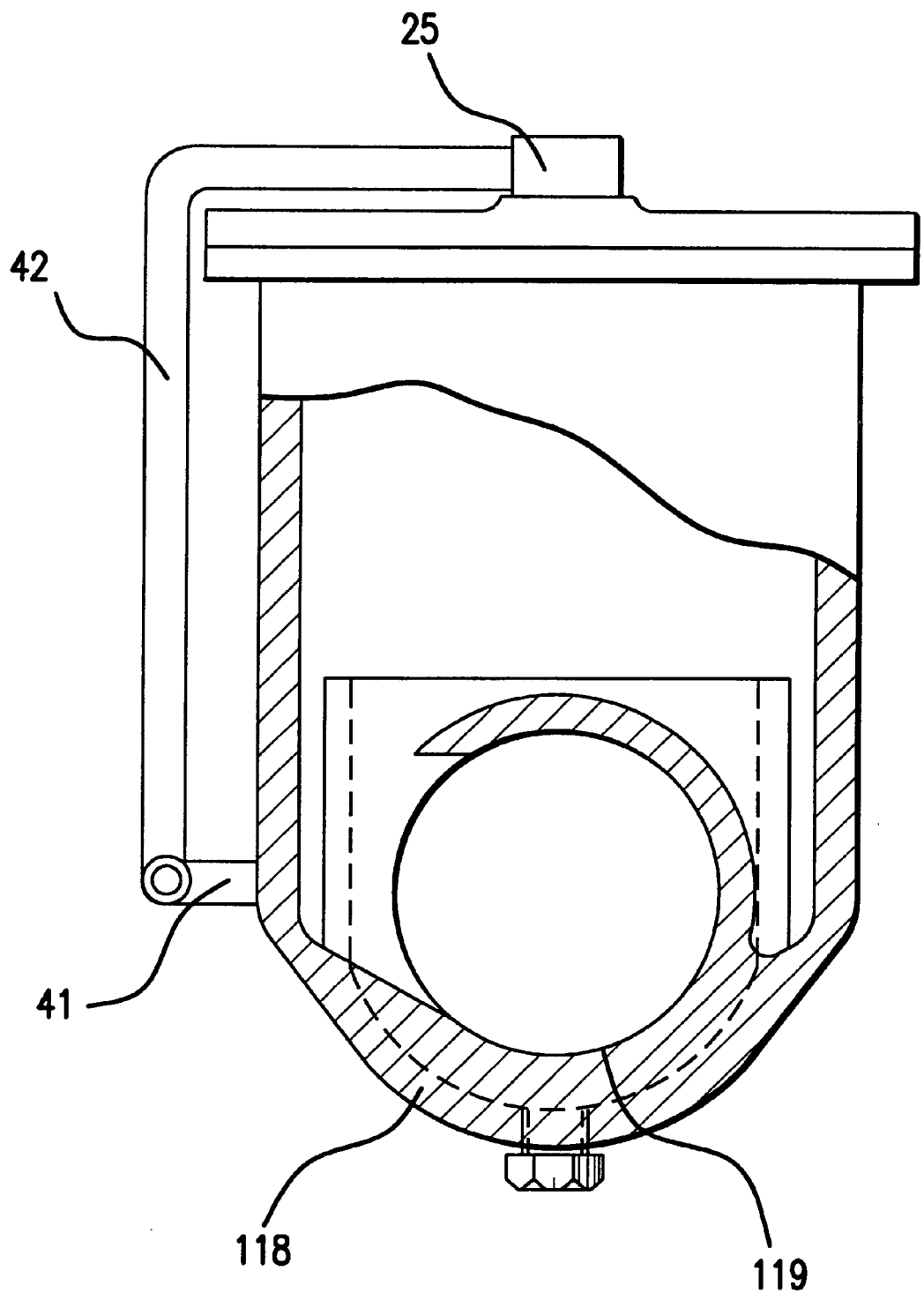

The left-half part of FIG. 6 is a cross sectional view taken along with line D—D in FIG. 4 and the right-half part of FIG. 6 is a cross sectional view taken along with line E—E in FIG. 4.

Figure 1:
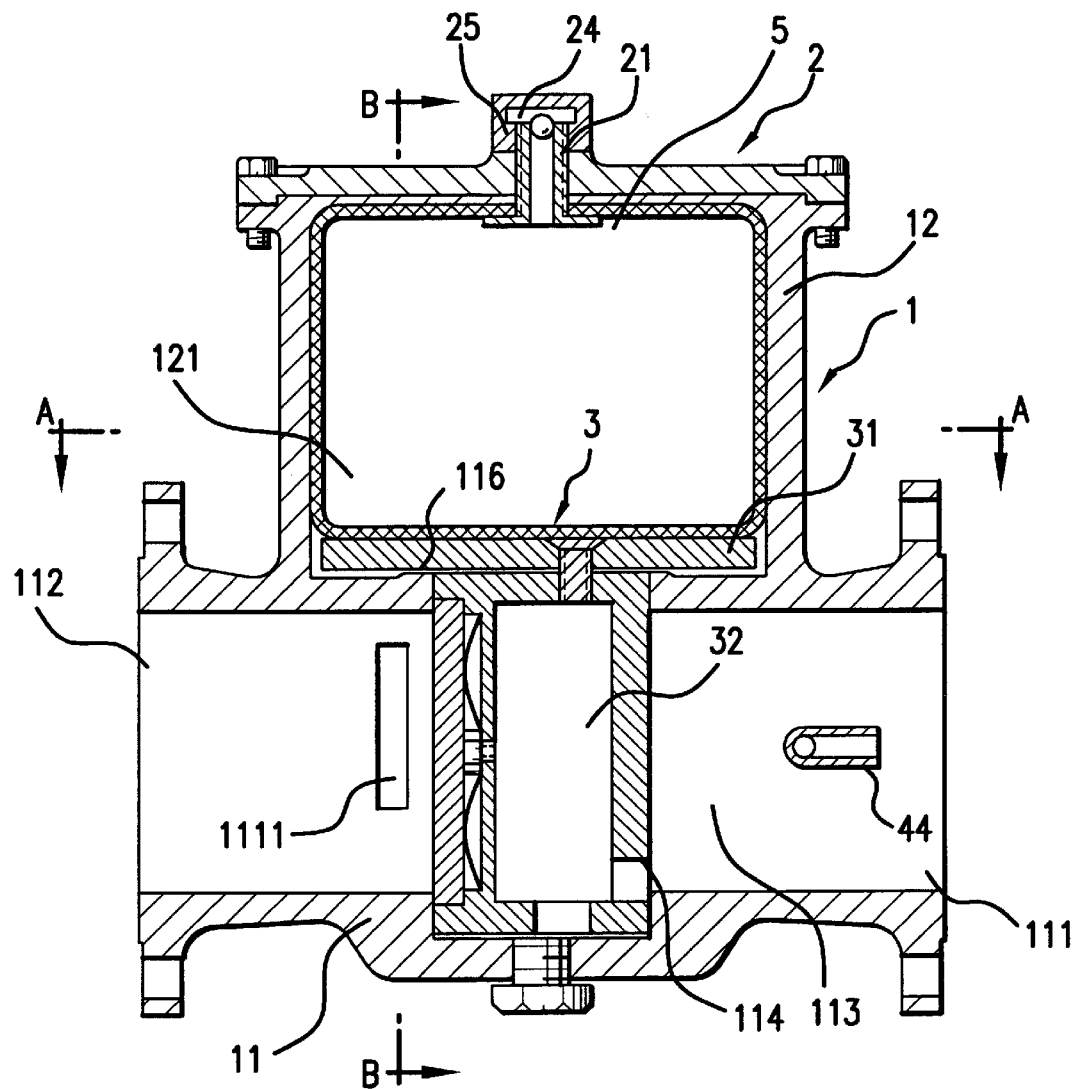
FIG. 1 is a longitudinal cross sectional view of the first embodiment of the fluid actuating valve of the present invention in a closed position.

FIG. 7 is a longitudinal cross sectional view of the vertical square box assembly as a part of the valve core assembly of FIG. 1.

FIG. 8 is a top view of the vertical square box assembly of FIG. 7.

FIG. 9 is a left view of a vertical square box of the vertical square box of FIG. 7.

FIG. 10 is an enlarged view of Part I of FIG. 7.

Figure 11:
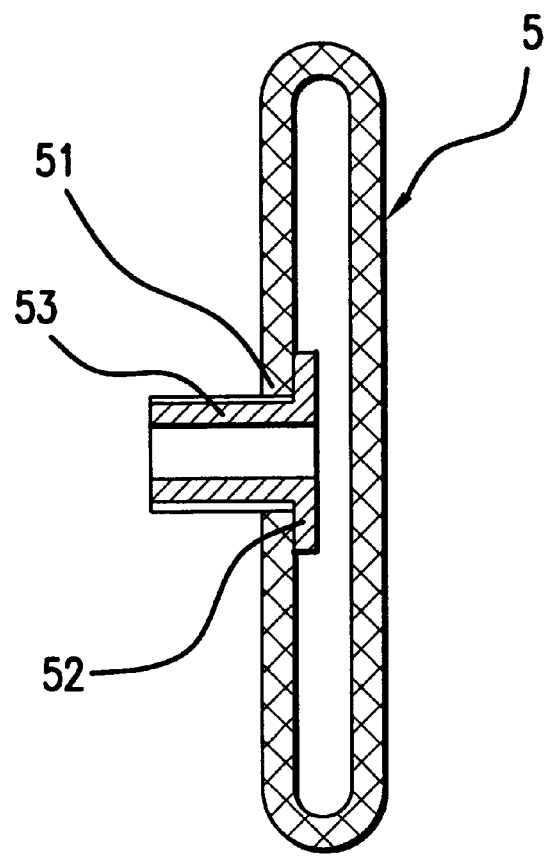

FIG. 11 is a longitudinal cross sectional view of a fluid pocket of FIG. 1.

Figure 12:
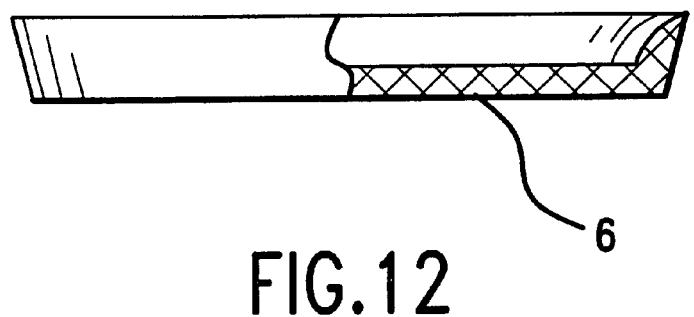

FIG. 12 is a longitudinal cross sectional view of a rubber piston.

Figure 13:
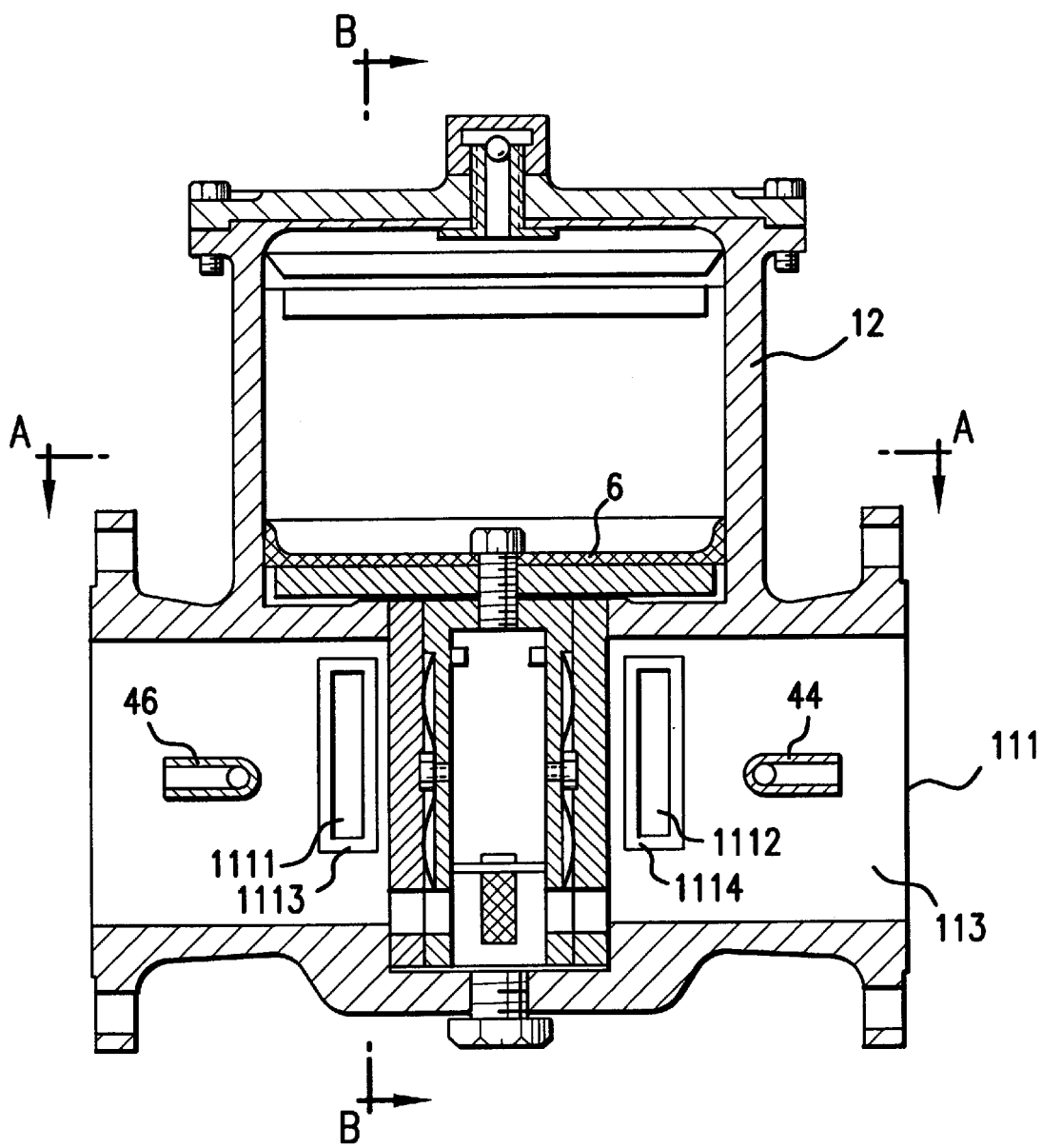

FIG. 13 is a longitudinal cross sectional view of the second embodiment of the fluid actuating valve of the present invention.

Figure 14:
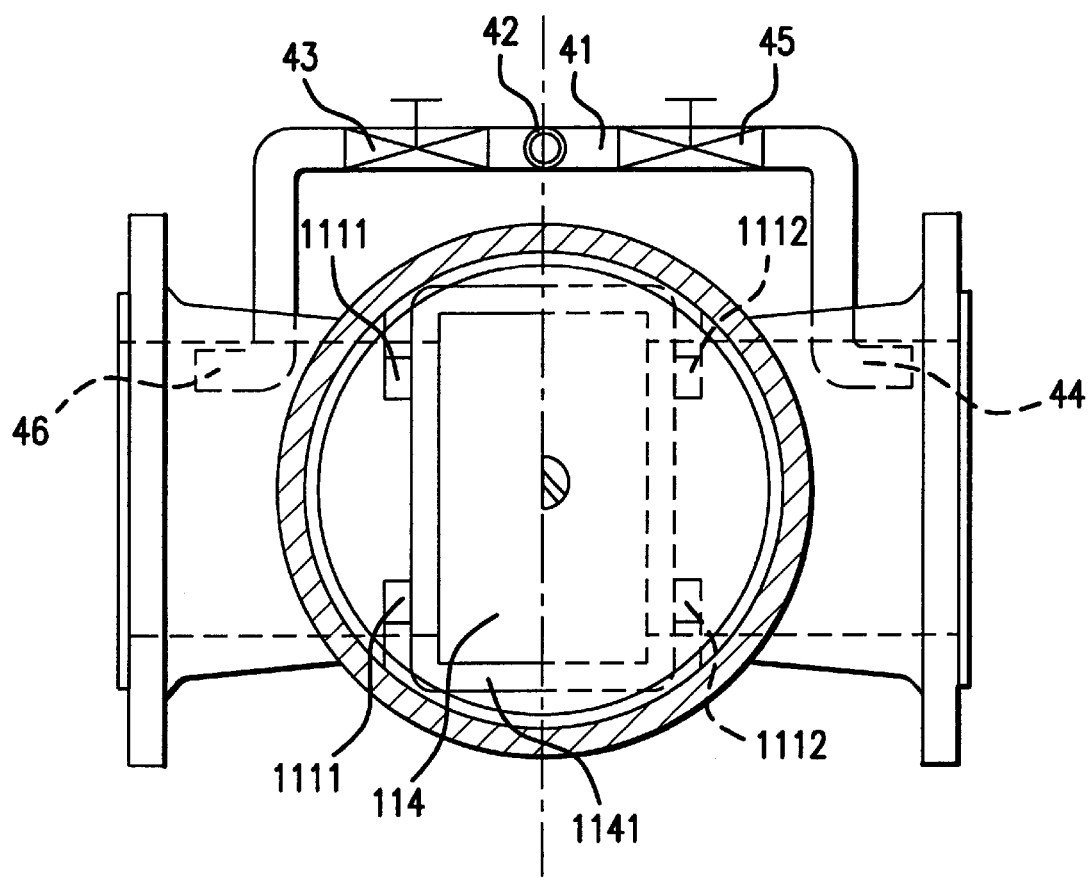

FIG. 14 is a cross sectional view taken along with line A—A in FIG. 13.

Figure 15:
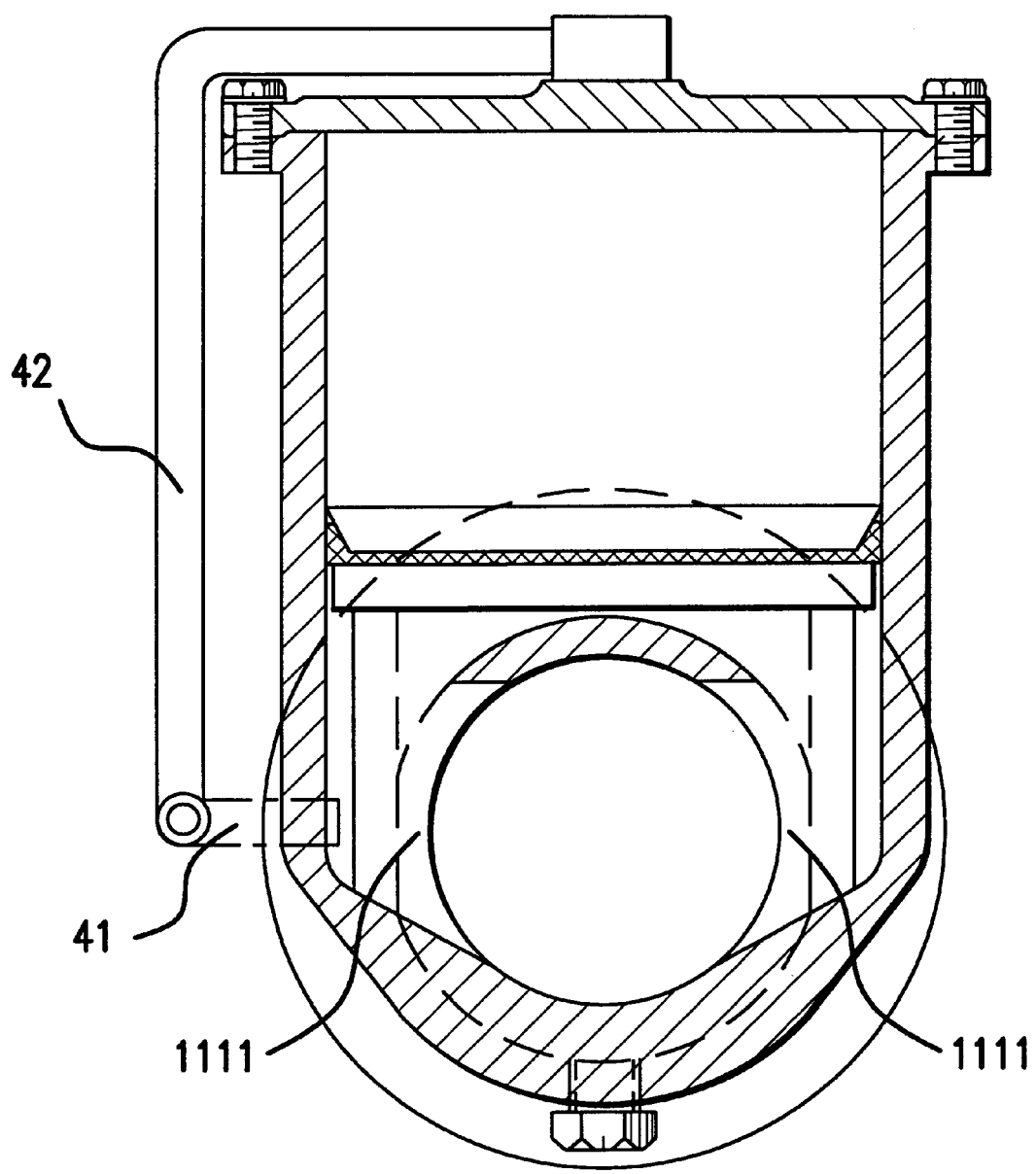

FIG. 15 is a cross sectional view taken along with line B—B in FIG. 13.

Figure 16:
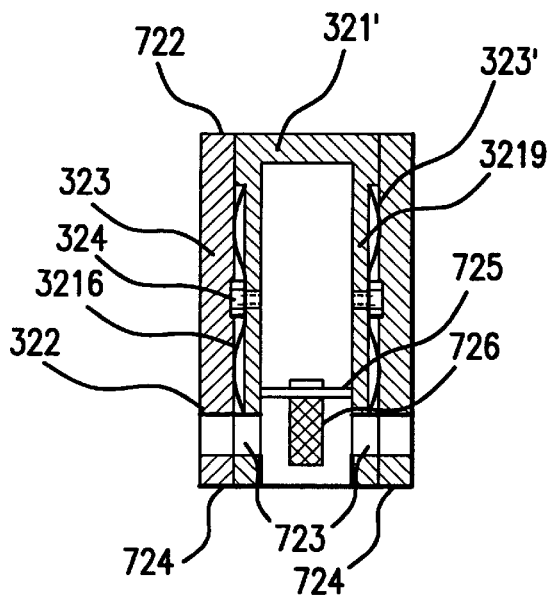

FIG. 16 is a longitudinal cross sectional view of the vertical square box assembly as part of the valve core assembly of FIG. 13.

Figure 17:
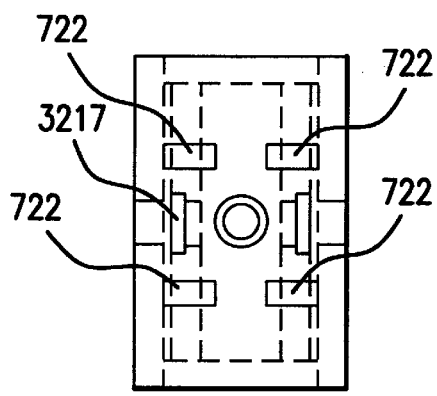

FIG. 17 is a top view of the vertical square box assembly of FIG. 16.

Figure 18:
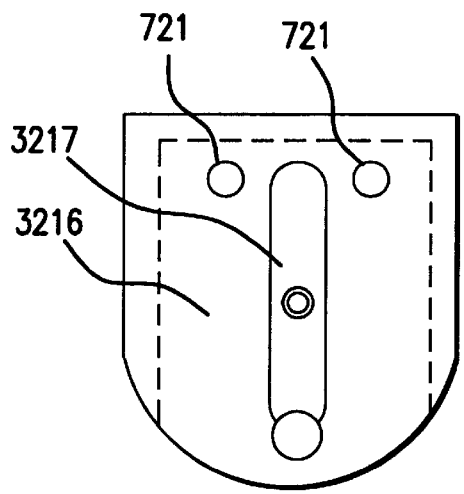

FIG. 18 is a left view of the vertical square box of the vertical square box assembly of FIG. 16.

BEST MODES FOR CARRYING OUT THE INVENTION

Referring to the drawings, the embodiments of the present invention will be described in detail hereinafter.

Figure 2:
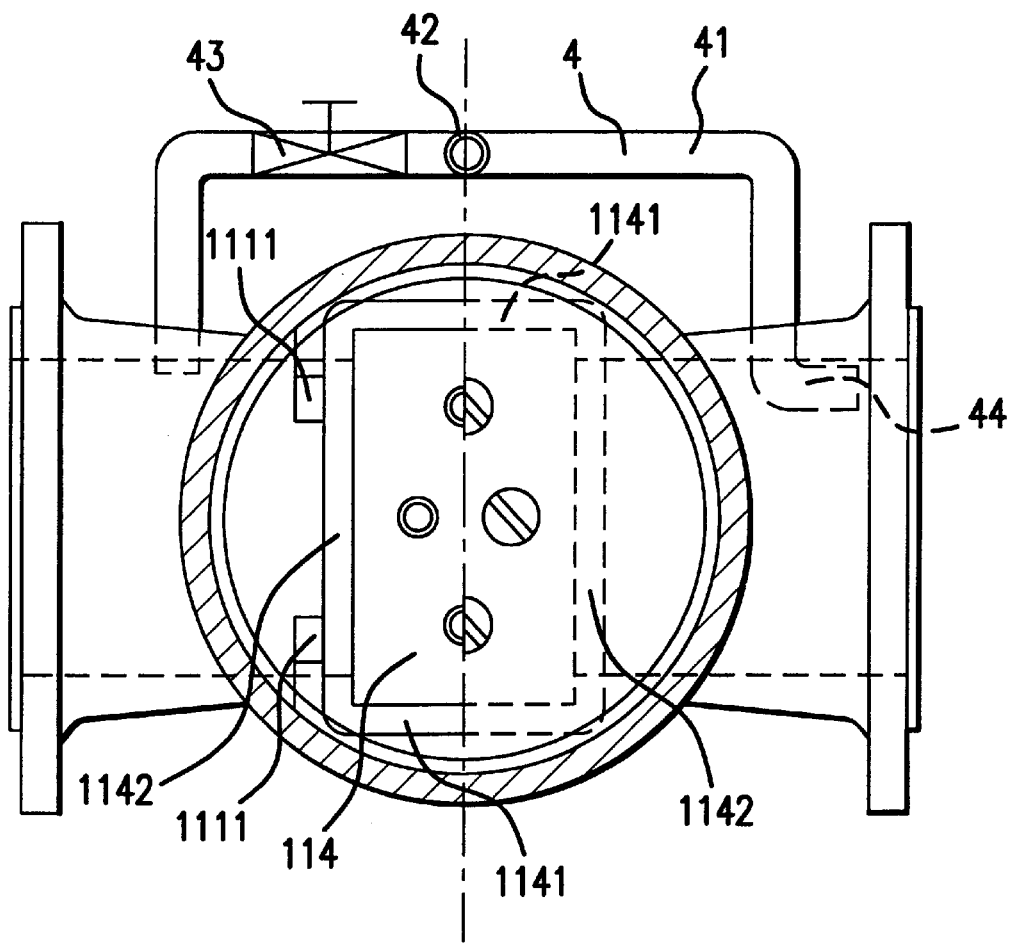
FIG. 2 is a cross sectional view taken along with line A—A in FIG. 1.
Figure 3:
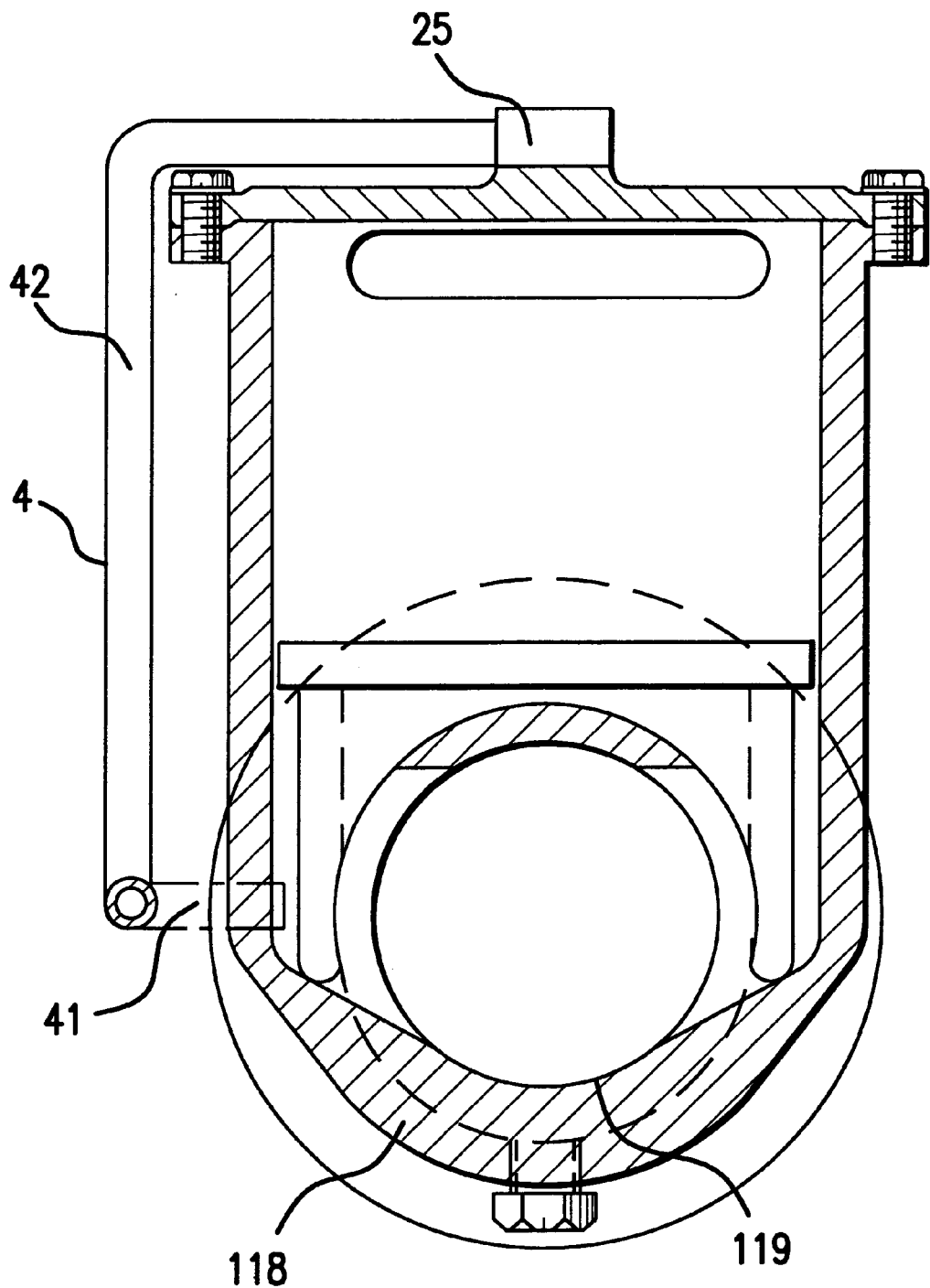
FIG. 3 is a cross sectional view taken along with line B—B in FIG. 1.

The first embodiment the fluid actuating valve of the present invention is shown in FIGS. 1–3. In this valve, the fluid can only flow in one direction.

As shown in FIGS. 1–3, the valve includes valve body 1, valve cap 2, valve core assembly 3 and fluid controlling pipe assembly 4 and actuating element 5.

Figure 5:
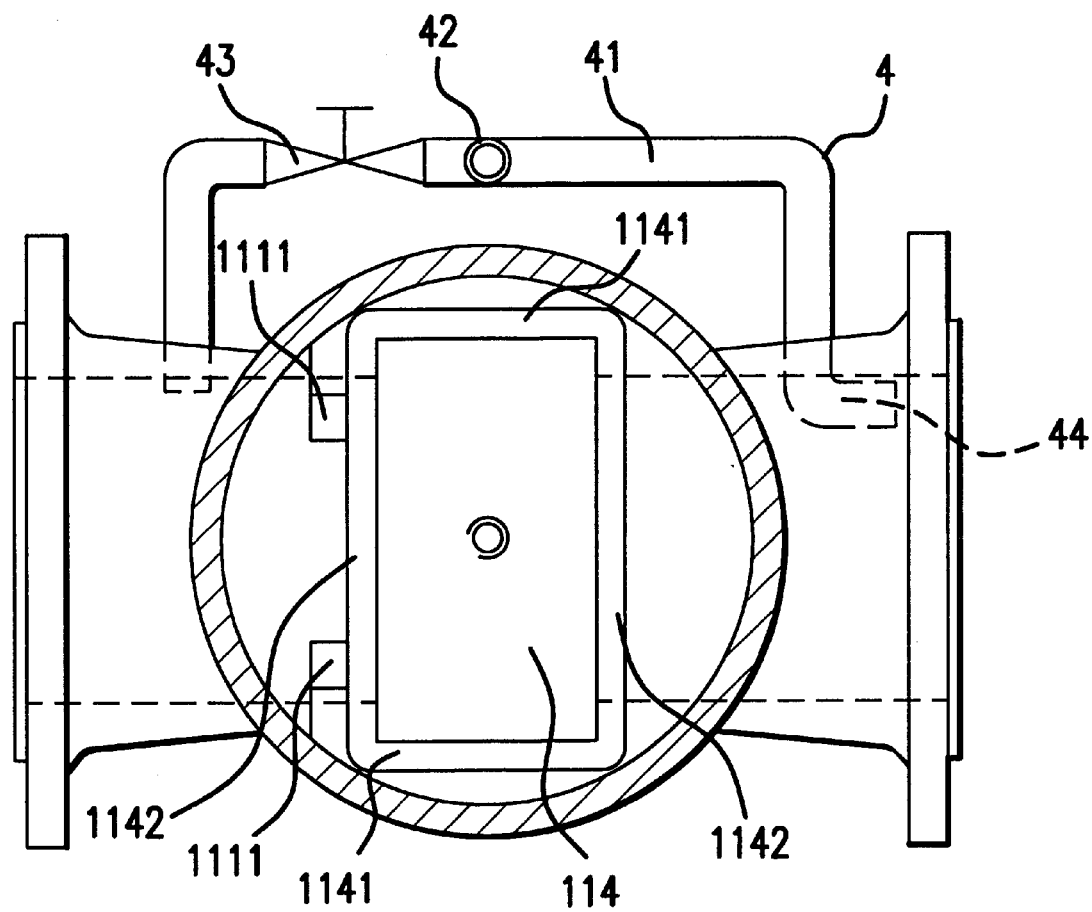
FIG. 5 is a cross sectional view taken along with line C—C in FIG. 4.

As shown in FIGS. 1–3, particularly, in FIGS. 4–6, valve body 1 comprises longitudinal tubular body 11 and transversal cylinder body 12, they usually have a substantively circular shape in cross section view and they are integrated together. Longitudinal tubular body 11 defines vertical fluid passage 113 from valve inlet 111 to valve outlet 112. Transversal cylinder body 12 defines valve chamber 121. Transversal well 114 is disposed in the middle of vertical fluid passage 113. Opening 115 on the upper portion of transversal well 114 connects vertical fluid passage 113 with valve chamber 121. Transversal well 114 has a flat upper surface 116 which forms the valve seat of the valve. Upper surface 116 projects upwardly from arc surface 117 of longitudinal tubular body 11 located in valve chamber 121, and upper surface 116 is higher than arc surface 117. Bottom surface 118 of transversal well 114 is an arc surface caves downwardly from arc surface 119 of vertical fluid passage 113 and is lower than arc surface 119. Two symmetrical pressure-releasing holes 1111 are formed on longitudinal pipe body 11 of valve outlet 112 side and adjacent to transversal well 114. Pressure-releasing holes 1111 connect valve chamber 121 with vertical fluid passage 113 of valve outlet 112 side. As shown in FIGS. 2 and 5, transversal well 114 is of square shape, two longitudinal sides 1141 and two transversal sides 1142 thereof are symmetrical to the vertical axis of the valve respectively. Alternatively, two transversal sides 1142 of the square transversal well may not be symmetrical (not shown). In this case, transversal sides 1142 of valve outlet 112 side may be closer to the vertical axis of the valve than transversal side 1142 of valve inlet 111 side might be. In addition, transversal well 114 can also be circular or even semicircular-shaped. The terms of "square", "circular" and "semicircular" refer to the cylinder shape of transversal well 114. Regardless the shape of transversal well 114, it has an arc-shaped bottom 118.

As shown in FIG. 1, valve core assembly 3 comprises a horizontal valve plate 31 and vertical valve assembly 32 fixed to the plate. Usually, valve plate 31 is circular-shaped and can hermetically contact upper surface 116 of transversal well 114 to shut opening 115 of transversal well 114. The shape of vertical valve assembly 32 varies with the shape of transversal well 114.

When transversal well 114 is square-shaped and two transversal sides 1142 thereof are unsymmetrical to the vertical axis of the valve, vertical valve assembly 32 is a vertical valve plate which can reach into transversal well 114, whose surface facing valve outlet 112 can tightly contact the wall of transversal well 114 facing valve inlet 111 to shut the valve. The lower portion of the vertical valve plate is arc-shaped.

When transversal well 114 is square-shaped and two transversal sides 1142 thereof are symmetrical to the vertical axis of the valve, vertical valve assembly 32 can be a vertical square box (not shown) which can reach into transversal well 114. The surface of the vertical wall of the vertical square box facing valve outlet 112 side can hermetically contact the surface of the wall of transversal well 114 facing valve inlet 111 side to shut the valve. A hole is formed at the lower part of the vertical wall of the vertical square box of valve inlet 111 side and at the arc-shaped bottom wall of the vertical square box respectively. The vertical square box might have no bottom wall.

When transversal well 114 is square-shaped and two transversal sides 1142 thereof are symmetrical to the vertical axis of the valve, vertical valve assembly 32 may be a vertical square assembly as shown in FIG. 1, and FIGS. 7–10, which can reach into transversal well 114. The vertical square box assembly comprises a vertical square box 321, a curve-shaped spring 322 and a plate 323. Top wall 3211 and arc-shaped bottom wall 3212 of vertical square box 321 extend towards valve outlet 112 side respectively and form protruding edges 3213 and 3214. A horizontal slot 3215 is formed under protruding edge 3213. A vertical slot 3217 is formed in the middle of the outer surface of vertical wall 3216 of vertical square box 321 of valve outlet 112 side. Curve-shaped spring 322 is fixed in vertical slot 3217 with screw 324. Plate 323 with arc-shaped lower portion is disposed between protruding edges 3213 and 3214. Projection 3218 on the upper surface of plate 323 reaches into horizontal slot 3215. Plate 323 can slide to valve outlet 112 side under the force of curve-shaped spring 322. The surface of plate 323 facing outlet 112 side can hermetically contact the wall of transversal well 114 facing inlet 111 side to shut the valve. A hole is formed at the low portion of vertical wall 3219 of vertical square box 321 of inlet 111 side and at bottom wall 3212 respectively.

When transversal well 114 is circular-shaped, vertical valve assembly 32 is a vertical cylinder box (not shown) which can reach into transversal well 114. The cylinder wall of the vertical cylinder box contacts the cylinder wall of transversal well 114 hermetically and thus shuts the valve. A hole is formed at the low part of the cylinder wall of vertical cylinder box facing valve inlet 111 side and at the arc-shaped bottom wall respectively. The vertical cylinder box might have no bottom wall.

When transversal well 114 is semicircle-shaped, vertical valve assembly 32 is a vertical semi-cylinder box (not shown) which can reach into transversal well 114. The vertical flat wall of the vertical semi-cylinder box locates at valve outlet 112 side, and the vertical semi-cylinder wall locates at valve inlet 111 side. The outer surface of the vertical flat wall of the vertical semi-cylinder box contacts the wall of transversal well 114 facing valve inlet 111 side hermetically and thus shuts the valve. A hole is formed at the low part of the semi-cylinder wall of the vertical semi-cylinder box and at the arc-shaped bottom wall respectively. The vertical semi-cylinder box might have no bottom wall.

As shown in FIGS. 1 and 11, the actuating element can be a deformable fluid pocket 5. Fluid pocket 5 is a rubber pocket with a hole 51 on its top. Connecting pipe 53 with flange 52 on its one end extends out from hole 51 and passes through hole 21 on the valve cap. The rubber pocket is fixed below valve cap 2 by nut 25 having a small chamber 24.

As shown in FIGS. 12 and 13, the actuating element can be a piston 6. Piston 6 can slip up and down hermetically along the inner wall of transversal cylinder 12. The shown piston 6 is a rubber-disposed bowl, and fixed above horizontal plate 31 of valve core assembly 3 by a bolt.

As shown in FIGS. 1–6, fluid-controlling pipe assembly 4 comprises a first small-caliber pipe 41 for connecting vertical fluid passage 113 on valve inlet 111 side with vertical fluid passage 113 on valve outlet 112 side; a second small-caliber pipe 42 sticking out from the center of the first small-caliber pipe 41 and connecting with small chamber 24 of nut 25 on valve cap 2; a manual or automatic valve installed on the first small-caliber pipe 41 at a place between the second small-caliber pipe 42 and valve outlet 112. In order to make the pressure fluid coming from valve inlet 111 flow freely into the first small-caliber pipe 41, bending pipe 44 is installed at the inlet of the first small-caliber pipe 41. The pressure fluid entering into the first small-caliber pipe 41 is called controlling fluid.

The fluid actuating valve of the first embodiment of the present invention works as follows: when manual or automatic valve 43 of controlling fluid pipe assembly 4 is shut, the controlling fluid will flow into deformable pocket 5 or valve chamber 121 from the first small-caliber pipe 41 via valve cap 2. Deformable fluid pocket 5 or piston 6 installed in valve chamber 121 will push downwards valve core assembly 3 by the pressure of the controlling fluid. The fluid in valve chamber 121 flows into longitudinal fluid passage 113 of valve outlet 112 side from the pressure-releasing hole. The pressure of fluid in chamber 121 drops dramatically and valve core assembly 3 slips downwardly dramatically and blocks upper opening 115 of transversal well 114 and longitudinal fluid passage 113 of valve outlet 112 side. As a result, the valve is shut. When manual or automatic valve 43 of controlling fluid pipe assembly 4 is opened, the controlling fluid in pocket 5 will flow into longitudinal fluid passage 113 of valve outlet 112 side through the second small-caliber pipe 42 and the first small-caliber pipe 41 between the second small-caliber pipe 42 and valve outlet 112, which will release the pressure of the controlling fluid in pocket 5 or valve chamber 121. Valve core assembly 3 will be lifted under the pressure of the pressure fluid coming from valve inlet 111 side (which will also push pocket 5 or piston 6 upwardly simultaneously). Therefore, the valve is opened. In order to prevent the controlling fluid of the first small-caliber pipe 41 from affecting the release of the controlling fluid in pocket 5 or valve chamber 121, the diameter of the first small-caliber pipe 41 of between the second small-caliber pipe 42 and valve outlet 112 should be larger than that of between the second small-caliber pipe 42 and valve inlet 111. Moreover, the lifting or dropping height of controlling valve core assembly 3 can be adjusted by regulating manual or automatic valve 43 of fluid pipe assembly 4. Therefore, the volume of the pressure fluid can be adjusted.

The second embodiment of the fluid actuating valve of the present invention is shown in FIGS. 13–18. The fluid in this valve can flow in two directions.

The structure of the fluid actuating valve of the second embodiment of the present invention is substantially the same as that of the first embodiment of the present invention. The same parts are labeled with same label. In consideration of simplification, only the different parts are described here.

As shown in FIGS. 13–15, pressure-releasing hole 1112 symmetrical to pressure-releasing hole 1111 is formed on longitudinal tubular body 11 of valve body 1. One-way valves 1113 and 1114 are disposed within longitudinal tubular body 11 which can block pressure-releasing holes 1111 and 1112 respectively (as shown by the dot line in FIG. 13). One-way valves 1113 and 1114 only allow the pressure fluid to flow from valve chamber 121 to longitudinal fluid passage 113. One-way valves 1113 and 1114 can also be replaced by an one-way valve having other structures, such as spring element or a spherical or conic assembly (not shown).

As shown in FIGS. 13–15, another manual or automatic valve 45 is installed on the first small-caliber pipe 41 of controlling fluid pipe assembly 4. Manual or automatic valves 43 and 45 are located on both sides of the second small-caliber pipe 42. Another bending pipe 46 is installed at the other end of the first small-caliber pipe and is symmetrical to bending pipe 44.

In the fluid actuating valve of the second embodiment of the present invention, the vertical square box assembly which an reach into transversal well 114 as shown in FIGS. 16–18 is used to replace that as shown in FIGS. 7–10. The vertical square box assembly as shown in FIGS. 16–18 comprises a vertical square box 321', two curve-shaped springs 322 and two plates 323'. At the middle of the outer surfaces of front and back vertical walls 3216 and 3219 of vertical square box 321', a vertical slot 3217 is formed respectively. Spring 322 is fixed in vertical slot 3217 by screw 324 respectively. Two pinholes 721 are formed on both sides of slot 3217 respectively. Two pins 722 are fixed to the two plates 323' respectively. Two plates 323' with fixed pins 722 are installed on both sides of vertical walls 3216 and 3219 respectively. Pins 722 enter into the corresponding pinholes 721 and can slip freely therein. Plates 323' can slip to both sides under the force of spring 322. At the low part of vertical walls 3216 and 3219, through-holes 723 are formed eye to eye. Two through-holes 724 are formed at the low part of plates 323'. Through-holes 723 and 724 are aligned each other. A shaft 725 is disposed between vertical walls 3216 and 3219. A vertical small valve plate 726 is disposed on shaft 725. Small valve plate 726 can move along shaft 725 and block holes 723 disposed at the low part of vertical wall 3216 or 3219 under various directional pressures. Vertical square box 321' might have no bottom wall.

The operation of the fluid actuating valve of the second embodiment of the present invention is the same as that of the first embodiment of the present invention. To make it clearer, particular explanations are given as follows:

Assuming the pressure fluid flows from longitudinal fluid passage 113 of the side having installed with bending pipe 44 (For the sake of simplicity, it is called inlet side) to longitudinal fluid passage 113 of the side having installed with bending pipe 46 (For the sake of simplicity, it is called outlet side). In this case, manual or automatic valve 45 of controlling fluid passage assembly 4 should be maintained open all the time, and the opening and shutting of the fluid actuating valve is controlled by manual or automatic valve 43. Small valve plate 726 disposed between vertical walls 3216 and 3219 of vertical square box 321' moves towards vertical wall 3216 under the pressure of the inlet side pressure fluid, and thus block through-holes 723 at the low part of vertical wall 3216. When manual or automatic valve 43 is opened, valve core assembly 4 will be lifted to open the valve in the same way as described in the first embodiment of the present invention. When manual or automatic valve 43 is shut, one-way valve 1113 on the outlet side will open pressure-releasing hole 1111, and valve core assembly 4 will drop rapidly to shut the valve in the same way as described in the first embodiment of the present invention.

The way of the pressure fluid flowing from longitudinal fluid passage 113 of the side having installed with bending pipe 46 (For the sake of simplicity, it is called inlet side) to longitudinal fluid passage 113 of the side having installed with bending pipe 44 (For the sake of simplicity, it is called outlet side) is obvious to those skilled in the art and it is not necessary to describe it anymore.

Industrial Applicability

The present invention is suitable for application in any liquid and gas transportation through pipes as to dredging, cutting-off, flow adjusting etc.. In particular, the present invention is suitable for producing heavy-caliber fluid actuating valves which can work under high pressure.

What I claimed is:

1. A fluid actuating valve composed of a valve body, a valve cap, a valve core assembly, a fluid-controlling pipe assembly and an actuating element, characterized in that: the valve body comprises a longitudinal tubular body and a transversal cylinder body, the longitudinal tubular body defines a fluid passage from the inlet to the outlet of the valve body, and the transversal cylinder body defines a valve chamber, a transversal well is disposed in the middle of the longitudinal tubular body for communicating the longitudinal fluid passage with the valve chamber, and the upper surface of the transversal well defines a valve plate eat, a valve core assembly is provided in the transversal well, which engages with the inner wall of the well and the valve plate seat and is lifted by the pressure fluid which comes from the valve inlet in a first direction to open the valve whereby said fluid flows in a second direction through the fluid passage and enters into the valve outlet, the second direction is the same as the first direction, a pressure-releasing hole is provided at the outlet side of the longitudinal tubular body to communicate the valve chamber with the longitudinal fluid passage at the outlet side whereby the fluid in the valve chamber enters into the outlet side of the longitudinal fluid passage while the valve assembly is moved down, an actuating element is installed in the valve chamber under the valve cap, which can drop the valve core assembly to shut the valve by the pressure fluid coming from the fluid-controlling pipe assembly.

2. The valve according to claim 1, characterized in that the fluid-controlling pipe assembly comprises a first small-caliber pipe for connecting the longitudinal fluid passage of the inlet side with the longitudinal fluid passage of the outlet side; a second small-caliber pipe sticking out from the center of the first small-caliber pipe; the second small-caliber pipe passes through the valve cap and enters into the valve chamber; a manual or automatic valve is provided on the first small-caliber pipes at a place between the second small-caliber pipe and the valve outlet.

3. The valve according to claim 2, characterized in that the actuating element installed in the valve chamber is a deformable fluid pocket, and the inner space of the pocket connects with the second small-caliber pipe.

4. The valve according to claim 2, characterized in that: the actuating element installed in the valve chamber is a piston which can move up and down along the inner surface of the transversal cylinder hermetically.

5. The valve according to claim 2, characterized in that: the transversal well is a substantially square-shaped tube and the bottom of the transversal well is arc-shaped; the valve core assembly comprises a horizontal valve plate and a vertical valve plate which is fixed to the horizontal valve plate and can enter into the well, the lower surface of the horizontal valve plate can hermetically contact the valve plate seat, the surface of vertical valve plate facing the valve outlet can hermetically contact the wall of the well facing the valve inlet.

6. The valve according to claim 1, characterized in that: the transversal well is a substantially square-shaped tube and the bottom of the transversal well is arc-shaped, the valve core assembly comprises a horizontal valve plate and a vertical square-box which is fixed to the horizontal valve plate and can enter into the well, the lower surface of the horizontal valve plate can hermetically contact the valve seat, the surface of the vertical wall of the vertical square-box of the valve outlet side, which faces the valve outlet, can hermetically contact the wall of the well, which faces the valve inlet, at least one through hole is provided on the vertical wall of the vertical square box on the inlet side and the bottom of the vertical square-box is open left.

7. The valve according to claim 6, characterized in that: the bottom of the vertical square-box has an arc-shaped bottom wall on which at least one through hole is provided.

8. The valve according to claim 7, characterized in that: the top and arc-shaped bottom walls of the vertical square-box extend towards the valve outlet and form a horizontal protruding edge on the top and arc-shaped protruding edge at the bottom respectively, a horizontal slot is provided on the lower surface of the horizontal protruding edge, a vertical slot is provided in the middle of the surface, which faces the outlet, of the vertical wall of the vertical square-box assembly of the outlet side, a curve-shaped spring is installed in the vertical slot, a plate with arc-shaped bottom is installed between the horizontal protruding edge of the top wall and the arc-shaped protruding edge of the bottom wall of the vertical square-box, the upper surface of the plate is horizontal and has a horizontal protrusion which enters into the horizontal slot in the top protruding edge, the plate can slip towards the outlet and hermetically contact the surface of the well wall facing the inlet side by force of the curve-shaped spring.

9. The valve according to claim 6, characterized in that: a vertical slot is disposed in the middle of the vertical wall surface of the vertical square-box of the outlet side, a curve-shaped spring is installed in the vertical slot, two through pin-holes are disposed on both sides of the vertical slot, and two pins are fixed to a plate with arc-shaped bottom, the plate with fixed pins is installed on the vertical wall of the square-box of the outlet side through the pinholes, the plate can slip towards the outlet side under the force of curve-shaped spring and contact the surface of the well wall facing the inlet side hermetically.

10. The valve according to claim 3, characterized in that: the deformable fluid pocket has a top wall which is fixed to the valve cap.

11. The valve according to claim 4, characterized in that: the valve core assembly comprises a horizontal valve plate and the piston can be fixed to the horizontal valve plate.

12. The valve according to claim 3, characterized in that: the transversal well is substantially cylinder-shaped and the bottom of the transversal well is arc-shaped, the core assembly comprises a horizontal valve plate and a vertical cylinder-box which is fixed to the horizontal valve plate and can enter into the well, the lower surface of the horizontal valve plate can hermetically contact the valve seat, the cylinder wall of the vertical cylinder-box hermetically contact the wall surface of the transversal well, at least one through hole is disposed on the wall adjacent to the inlet side and the bottom of the vertical cylinder-box is open left.

13. The valve according to claim 12, characterized in that: the vertical cylinder-box has an arc-shaped bottom wall on which at least one through hole is provided.

14. A fluid actuating valve composed of a valve body, a valve cap, a valve core assembly, a fluid-controlling pipe assembly, and an actuating element, characterized in that: the valve body comprises a longitudinal tubular body and a transversal cylinder body, the longitudinal tubular body defines a longitudinal fluid passage, and the transversal cylinder body defines a valve chamber, a transversal well is disposed in the middle of the longitudinal tubular body to connect the vertical fluid passage with the valve chamber, the transversal well is substantially square-shaped tube and the bottom of the transversal well is arc-shaped, the upper surface of the transversal well defines a valve plate seat, a valve core assembly is disposed on the transversal well, the core assembly comprises a horizontal valve plate and a vertical square box assembly which is fixed to the horizontal valve plate and can enter into the transversal well, the lower surface of the horizontal valve plate can hermetically contact the valve plate seat, the vertical square box assembly includes a vertical square box and two vertical slots are formed in the middle of the front and back vertical walls of the box respectively, a curve-shaped spring is installed in each of the two vertical slots respectively, two pin-holes are formed on both sides of the slot, and two pins are fixed to a plate with arc-shaped bottom, the two plates with fixed pins are installed on the front and back walls of the box through the two pinholes, the plates can slip to both sides due to the curve-shaped springs and contact the corresponding well wall hermetically, two aligned holes are formed on the front and back vertical walls of the box and at the lower part of the two plates fixed to the walls respectively, a shaft with a small valve plate is installed between the two vertical walls, and the small valve plate can move along the shaft to block the through holes on the vertical walls by the various-directional pressure fluids, a pressure-releasing hole is formed on the longitudinal tubular body at both side of the transversal well respectively, which connects the valve chamber with the longitudinal fluid passage, an one-way valve is installed at the pressure-releasing hole, which only allows the fluid to flow from the valve chamber to the longitudinal fluid passage, an actuating element is installed in the valve chamber below the valve cap, which can drop the valve core assembly to shut the valve under the force of the fluid coming from the fluid-controlling pipe assembly.

15. The valve according to claim 14, characterized in that: the fluid-controlling pipe assembly comprises a first small-caliber pipe for connecting the longitudinal fluid passages on both sides of transversal well; a second small-caliber pipe sticking out from the center of the first small-caliber pipes; the second small-caliber pipe passes through the valve cap and enters into the valve chamber; a manual or automatic valve is installed on the first small-caliber pipe of both sides of the second small-caliber pipe.

16. The valve according to claim 15, characterized in that: the actuating element installed in valve chamber is a deformable fluid pocket, the second small-caliber pipe connects with the inner space of the pocket.

17. The valve according to claim 15, characterized in that: the actuating element installed in the valve chamber is a piston which can move up and down along the inner wall of the transversal cylinder hermetically.

18. The valve according to claim 16, characterized in that: the top wall of the deformable fluid pocket can connect firmly with the valve cap.

19. The valve according to claim 17, characterized in that: the horizontal valve plate of the valve core assembly can connect firmly with the piston.

* * * * *